United States Patent
Hottovy et al.

(10) Patent No.: US 7,179,426 B2
(45) Date of Patent: Feb. 20, 2007

(54) LARGE CATALYST ACTIVATOR

(75) Inventors: John D. Hottovy, Bartlesville, OK (US); James E. Hein, Houston, TX (US); Dale A. Zellers, Bartlesville, OK (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 426 days.

(21) Appl. No.: 10/457,236

(22) Filed: Jun. 9, 2003

(65) Prior Publication Data
US 2004/0052692 A1     Mar. 18, 2004

Related U.S. Application Data

(60) Provisional application No. 60/410,141, filed on Sep. 12, 2002.

(51) Int. Cl.
*B01J 8/44*  (2006.01)
*B01J 8/24*  (2006.01)
*B32B 27/12*  (2006.01)

(52) U.S. Cl. ............... 422/135; 422/311; 422/144; 422/138; 422/212

(58) Field of Classification Search ........ 422/135, 422/144, 145, 138, 311, 212; 526/68
See application file for complete search history.

(56) References Cited

U.S. PATENT DOCUMENTS

| | | | |
|---|---|---|---|
| 2,990,260 A | | 6/1961 | Mungen |
| 3,829,983 A | | 8/1974 | White |
| 4,136,061 A | * | 1/1979 | Hogan et al. ............ 502/6 |
| 4,863,884 A | * | 9/1989 | Tasker et al. .......... 502/27 |
| 5,733,510 A | * | 3/1998 | Chinh et al. .......... 422/143 |
| 6,218,484 B1 | * | 4/2001 | Brown et al. .......... 526/68 |

FOREIGN PATENT DOCUMENTS

| EP | 0963786 A | | 12/1999 |
|---|---|---|---|
| GB | 2060426 | * | 5/1991 |

OTHER PUBLICATIONS

Search Report from PCT Patent Application No. PCT/US03/28724.

* cited by examiner

*Primary Examiner*—N. Bhat
(74) *Attorney, Agent, or Firm*—Merchant & Gould

(57) ABSTRACT

A catalyst activator vessel for heat conditioning a catalyst is disclosed. The activator vessel includes inner and outer vessels, a perforated, normally generally horizontal grid plate within the inner vessel, and a fluid path extending through the grid plate within the vessel. The inner vessel can have an inside diameter of at least 50 inches (1.27 m). The space between the inner and outer vessels defines a flue. The perforated grid plate within the inner vessel can have an upper surface perforated with a pattern of overlapping, generally conical depressions and a lower surface, optionally overlapping by at least 17%. The fluid path extends upwardly through the perforated grid plate and is a conduit along which a fluid flows through the grid plate. The fluid will fluidize a particulate material, such as a catalyst, disposed above the grid plate in the inner vessel.

23 Claims, 4 Drawing Sheets

LARGE CATALYST ACTIVATOR

CROSS-REFERENCE TO RELATED APPLICATIONS

This application claims the benefit under 35 U.S.C. § 119(e) of U.S. Provisional Application No. 60/410,141 ("the '141 application") filed on Sep. 12, 2002. The '141 application, and U.S. Pat. Nos. 4,022,580 and 4,136,061 are incorporated by reference herein.

Not Applicable.

BACKGROUND OF THE INVENTION

The invention relates generally to a catalyst activator for heating the catalyst and conditioning it with a gas. The invention relates more particularly to a catalyst activator for conditioning olefin polymerization catalysts.

Many solid catalyst compositions, such as those employed in hydrocarbon conversion operations, e.g., polymerization, cracking, dehydrogenation, hydrogenation, and the like, are activated by subjecting the raw catalyst to elevated temperatures for an interval of time, while passing over the catalyst a stream of conditioning fluid which is inert, non-oxidizing, non-reducing, oxidizing, reducing, dry, or the like, depending on the particular nature of the catalyst and its intended use. One of the common objects of such treatment is the removal of moisture from the catalyst, since water is a catalyst poison in many applications.

Catalyst activation processes comprise drying an activating fluid such as air and passing it through a catalyst bed at a constant rate, while applying heat, until the catalyst reaches the desired temperature, at which point the catalyst is held at the activation temperature for the proper length of time. However, solid catalyst compositions are often relatively impermeable, thus requiring a shallow bed in order to obtain the required flow of activating fluid. The bed thus becomes large and expensive.

To alleviate the deficiencies encountered in activating solid particulate catalysts, including the continuous removal of impurities and catalyst poisons from the activation zones and temperature control of the bed, fluidized activation processes have been developed. In these processes, the catalyst is fluidized with a stream of activating fluid at elevated temperatures.

One type of fluidized bed catalyst activator has a grid plate through which fluidizing gas flows upwardly to levitate particulate matter, forming the fluidized bed. The upper surface of the grid plate is machined with an array of generally conical depressions that overlap essentially completely so the upper surface of the grid plate has no flat surfaces on which catalyst particles can accumulate and escape the conditioning effect of the fluidizing gas.

In one known catalyst activator the grid plate (see FIG. 1) is nominally 1.13 inch (28.58 mm) thick (dimension a, FIG. 1), has an inside diameter of 42 inches (1.07 m), and the generally conical depressions are predominantly 90-degree (angle b, FIG. 1) conical depressions having a nominal depth of one inch (25.4 mm) (dimensions a–c), a nominal diameter d at the upper major surface of 2.078 inches (52.78 mm), spaced apart in each direction by 1.781 inches (45.2 mm) from center to center, thus overlapping by about 16.7%.

The nominal layout of a single 90-degree conical depression of the 42-inch (1.07 m) grid plate is shown in FIG. 1. This known grid plate has 418 90-degree conical depressions, and around the outside periphery, where there is less clearance allowed to drill depressions, the grid plate has eighteen 70.5-degree conical depressions and twelve 60-degree conical depressions, for a total of 448 conical depressions of the three sizes provided. The depth of each type of conical depression is the same. The apex of each conical depression was bored through to the lower surface of the grid plate by drilling a 0.078 inch (1.98 mm) diameter (dimension e), 0.125 inch (3.175 mm) deep (dimension c) bore.

As polymerization reactors have increased in size or number at a given plant location, the amount of catalyst needed has increased, and a need has arisen to increase the amount of catalyst activated at a given time.

One approach to this problem is to provide more than one catalyst activator. This approach has the problem of requiring more equipment, operating personnel and other resources, including the vessels, sensors, piping, wiring, and computer capacity, than one catalyst activator.

Another approach to this problem is to operate a catalyst activator of the same diameter as before, but with a deeper fluidized bed of catalyst. A problem created by this approach is that a deeper fluidized bed allows less activation air and more activation effluent from the fluidized bed to contact each particle of the catalyst, which may reduce the quality of the resulting activated catalyst.

Yet another approach, increasing the diameter of the activator, has previously been rejected for at least two reasons.

First, increasing the diameter of the inner vessel reduces its surface area exposed to flue gases, as a proportion of the interior volume. As the diameter increases, the wall surface area of the inner vessel increases proportionally to the increase in diameter, while the volume of the inner vessel (assuming the depth of the vessel remains constant) increases proportionally to the square of the increase in diameter. Also, the heat must be transferred further to reach the center of a larger-diameter vessel. These effects reduce the amount of heat transferred per unit volume, per unit time, and per particle of the catalyst in the inner vessel.

Second, increasing the diameter of the grid plate that establishes a fluidized bed, and the size of the catalyst charge the grid plate is required to support, increases the weight of the grid plate, the diameter the grid plate must span, and the weight of catalyst the grid plate must bear. Simply scaling up the grid plate dimensions would require the grid plate to be quite thick to support both its own weight and that of a larger catalyst charge over a greater span. The depressions milled into the surface of the grid plate to eliminate flat areas further exacerbate this problem, as a considerable amount of metal is removed to form the depressions, thus effectively decreasing the thickness of the grid plate.

Thus, simply scaling up the catalyst activator is not a satisfactory solution to the problem of processing more catalyst per batch.

SUMMARY OF THE INVENTION

One aspect of the invention is a catalyst activator vessel for heat conditioning a catalyst. The activator vessel includes inner and outer vessels, a perforated, normally generally horizontal grid plate within the inner vessel, and a fluid path extending through the grid plate within the vessel.

The inner vessel can enclose a catalyst charge. The outer vessel generally surrounds the inner vessel. The space between the inner and outer vessels defines a flue.

The perforated grid plate within the inner vessel has an upper surface and a lower surface. The upper surface has a pattern of generally conical depressions that overlap by at least 17%. The grid plate is perforated by holes extending from the generally conical depressions through its lower surface. The fluid path extends upwardly through the perforated grid plate and is defined by a conduit along which fluidizing gas flows through the grid plate. The fluidizing gas will fluidize a particulate material, such as a catalyst, disposed above the grid plate in the inner vessel.

Another aspect of the invention is a catalyst activator vessel for heat conditioning a catalyst, in which the inner vessel has an inside diameter of at least 50 inches (1.27 m), the grid plate is more broadly defined as a normally generally horizontal, perforated grid plate disposed in the inner vessel, and other features are as described in the first aspect of the invention.

Another aspect of the invention is a fluidization bed comprising a vessel, a normally generally horizontal, perforated grid plate disposed in the vessel, and a fluid path extending upwardly through the grid plate. The grid plate and fluid path are defined above.

Another aspect of the invention is a perforated grid plate having an upper major surface perforated with a pattern of generally conical depressions and an opposed lower major surface, wherein the generally conical depressions overlap by at least 17%.

DEFINITIONS

As used in this specification:

"Generally," "normally," or "substantially," as in the phrases "generally horizontal," "an outer vessel generally surrounding said inner vessel," "generally conical depressions," generally cone-shaped," "generally funnel-shaped," "generally cylindrical portions," "normally disposed below the level of said outer margin," "substantially at said apex," and any others, is broadening language intending to embrace both a feature that is shaped, oriented, or located either exactly or approximately, and either fully or partially, as described in the balance of the phrase.

For example, a "generally horizontal" grid plate as defined in this specification can have a portion that is not horizontal—such as its outer flange. The entire plate can be not exactly horizontal, as it may have a concavity of 5 degrees or more below a horizontal plane, or it can be tilted somewhat out of a true horizontal orientation when in use, and still is regarded as "generally horizontal" herein. When a "generally horizontal" structure as defined here is not in use, it may be disposed in any orientation, even vertical, and still be "generally horizontal" as defined herein, providing it would be at least nearly horizontal when in normal use.

"Upper" and "lower" are defined with respect to a normal orientation of an article or part when used as contemplated in this specification.

"Overlapping," as in "overlapping, generally conical depressions," indicates two structures or surfaces that intersect in a finite region, so each structure or surface is interrupted by the other. "Completely overlapping" means that the overlap extends in an unbroken circle all the way around the conical depression in question, while "partially overlapping" is indicative that the overlap does not extend in an unbroken circle, but is broken at least at one point about the circumference of the depression. Percentage overlap refers to the amount, expressed as a percentage, by which the nominal diameter of a depression exceeds the center-to-center spacing between the depression and the nearest adjacent depression. A representative calculation of percentage overlap is provided in this specification.

DETAILED DESCRIPTION OF THE INVENTION

While the invention will be described in connection with one or more aspects, it will be understood that the invention is not limited to those aspects. On the contrary, the invention includes all alternatives, modifications, and equivalents as may be included within the spirit and scope of the appended claims.

Figure 1:
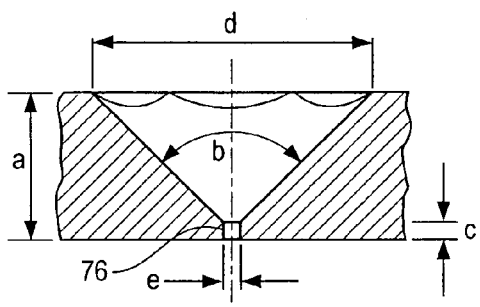
FIG. 1 is a fragmentary sectional view, taken similarly to FIG. 5, of a prior art grid plate, showing the nominal dimensions of a generally funnel-shaped 90-degree conical depression.

FIG. 1 represents the prior art, and is discussed in connection with FIG. 5 below.

Figure 2:
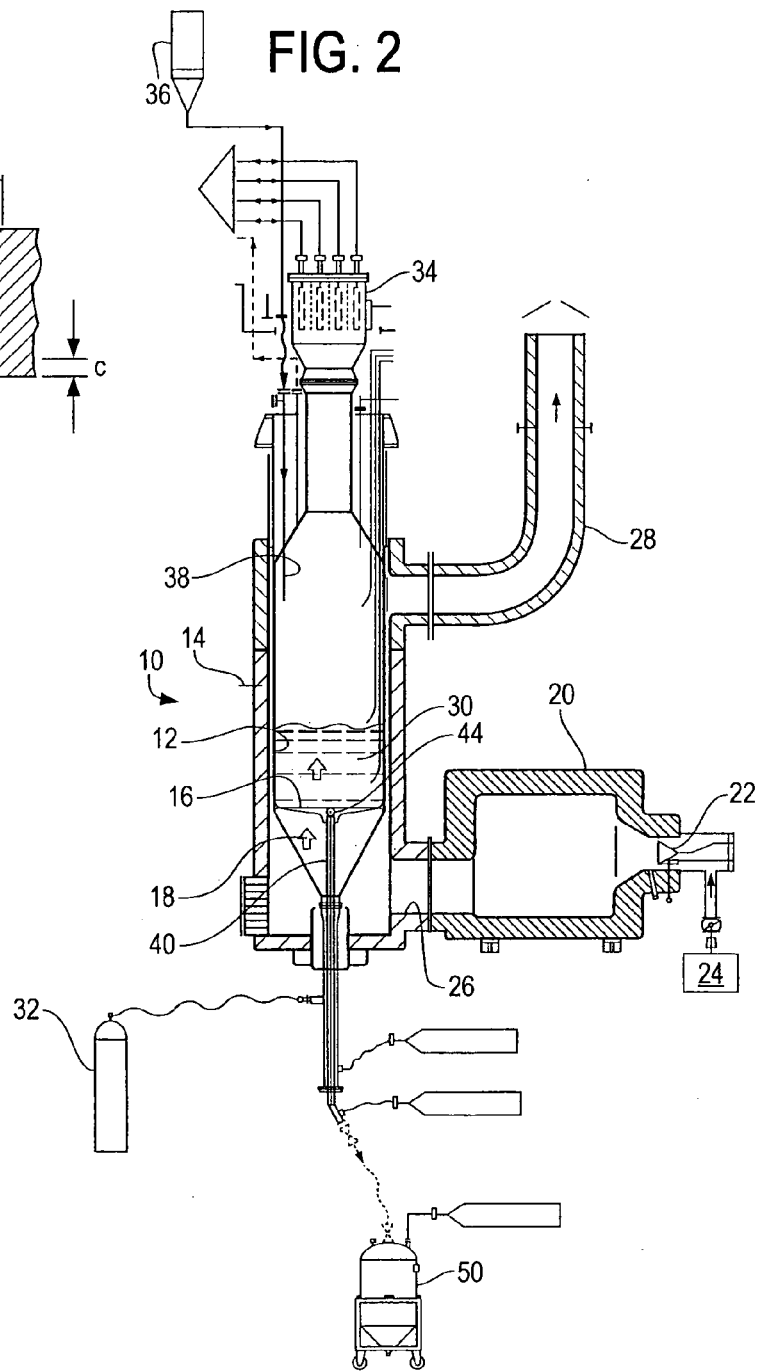
FIG. 2 is a schematic longitudinal section of a catalyst activator according to the present invention.

FIG. 2 shows a catalyst activator 10 according to the present invention for heat conditioning a catalyst. The illustrated activator 10 includes an inner vessel 12, an outer vessel 14 generally (here, partially) surrounding the inner vessel 12, a perforated grid plate 16, and a fluid path 18 defined in part by the perforations in the grid plate 16. These perforations are illustrated in the remaining Figures.

The activator 10 of this aspect of the invention further includes a furnace 20 having a gas burner 22 and an air supply 24 supplying combustion air. The furnace 20 has a flue 26 communicating with the outer vessel 14 and a smoke stack 28 also communicating with the outer vessel 14 to take away the exhaust from the furnace 20. Thus, the space between the inner and outer vessels 12 and 14 defines part of the flue that exchanges heat with the inner vessel 12 to heat the catalyst charge 30 when the charge is within the inner vessel 12. Any source of heat, such as electrical resistance heating, high temperature fluid, or high pressure steam, can also or instead be used to heat the activator 10. The specific heating arrangement employed here is not critical to the practice of the invention.

One surprising feature of the present invention is that the inner vessel 12 can be scaled up from a nominal 42-inch (1.07 m) inner diameter to a nominal 60-inch (1.52 m) inner diameter, thus approximately doubling the area of the grid plate 16 while increasing the surface area of the inner vessel 12 by less than 50%, and thus decreasing the surface area of the inner vessel 12 per unit volume within the inner vessel 12, without substantially reducing the rate at which the contents of the inner vessel can be heated to the very high temperature (800° F. to 1700° F., 427° C. to 927° C.) required for activation. The same rate of temperature increase achieved in the 42-inch (1.07 m) vessel can be achieved in the 60-inch (1.52 m) vessel by raising the flue gas temperature only a small amount.

While the inventor does not wish to be bound by the accuracy of the following theory, he theorizes that the heat transfer rate into the inner vessel 12 is unexpectedly high because much of the heat is transferred in the form of radiant heat, which transfers at a rate proportional to the fourth power of the temperature difference of the objects between which the heat transfer occurs. In other words, when the catalyst charge is relatively cool compared to the temperature of the flue gas, the rate of heat transfer to the catalyst charge is extremely high, so it quickly approaches the intended temperature. Also, a relatively small increase in the flue gas temperature causes a relatively large increase in the rate of radiant heat transfer, compared to the corresponding increase in convective or conductive heat transfer.

The activator 10 has a source 32 of a fluidizing medium, which in this aspect of the invention is nitrogen gas, although other gases, such as dry air, or potentially liquids may find use as a fluidizing medium, depending on the conditions required to activate the catalyst charge 30. The fluidizing medium 32 is introduced via the fluid path 18 upward through the grid plate 16 into the catalyst charge 30, with sufficient fluid velocity and under other conditions suitable to fluidize the catalyst charge 30. The fluidizing medium 32 also contacts the catalyst particles and optionally conditions them. For example, to remove moisture from the catalyst charge, the fluidizing medium 32 may be a dry preheated gas that will entrain or allow evaporation of moisture.

The fluidizing medium 32 and any effluent from the catalyst charge 30, such as fines and moisture, flows upward within the inner vessel 12 from the catalyst charge 30 to effluent treatment apparatus generally indicated as 34 of this aspect of the invention, which takes moisture and other effluents out of the fluidizing medium 32, and returns most of the fines to the catalyst charge 30.

In this aspect of the invention, the catalyst charge 30 to be conditioned is introduced from a catalyst supply 36 via a catalyst introduction conduit 38. In this aspect of the invention, the catalyst charge 30 is introduced into the inner vessel 12 by conveying it on a stream of inert fluid, such as nitrogen gas.

In this aspect of the invention, the conditioned catalyst charge 30 is removed from the inner vessel 12 via a drain 40 which extends from a drain hole 42 at the center of the grid plate. When the catalyst charge 30 is being conditioned, a cap 44 is set in the drain hole 42, blocking it. To remove the catalyst charge 30, the cap 44 is raised out of the drain hole 42 by elevating a plunger 46 connected by a plunger rod 48 to the cap 44. The fluidized bed will then drain through the drain 40 into a suitable vessel, such as the tote bin 50 shown in FIG. 2. Instead of discharging the catalyst charge 30 to the tote bin 50, the catalyst charge could alternatively be discharged directly to a reactor requiring the catalyst, although the illustrated arrangement is desirable for a direct fired activator, so the activator will not be a source of ignition for any release of hydrocarbon from the polymerization reactor equipment.

Figure 3:
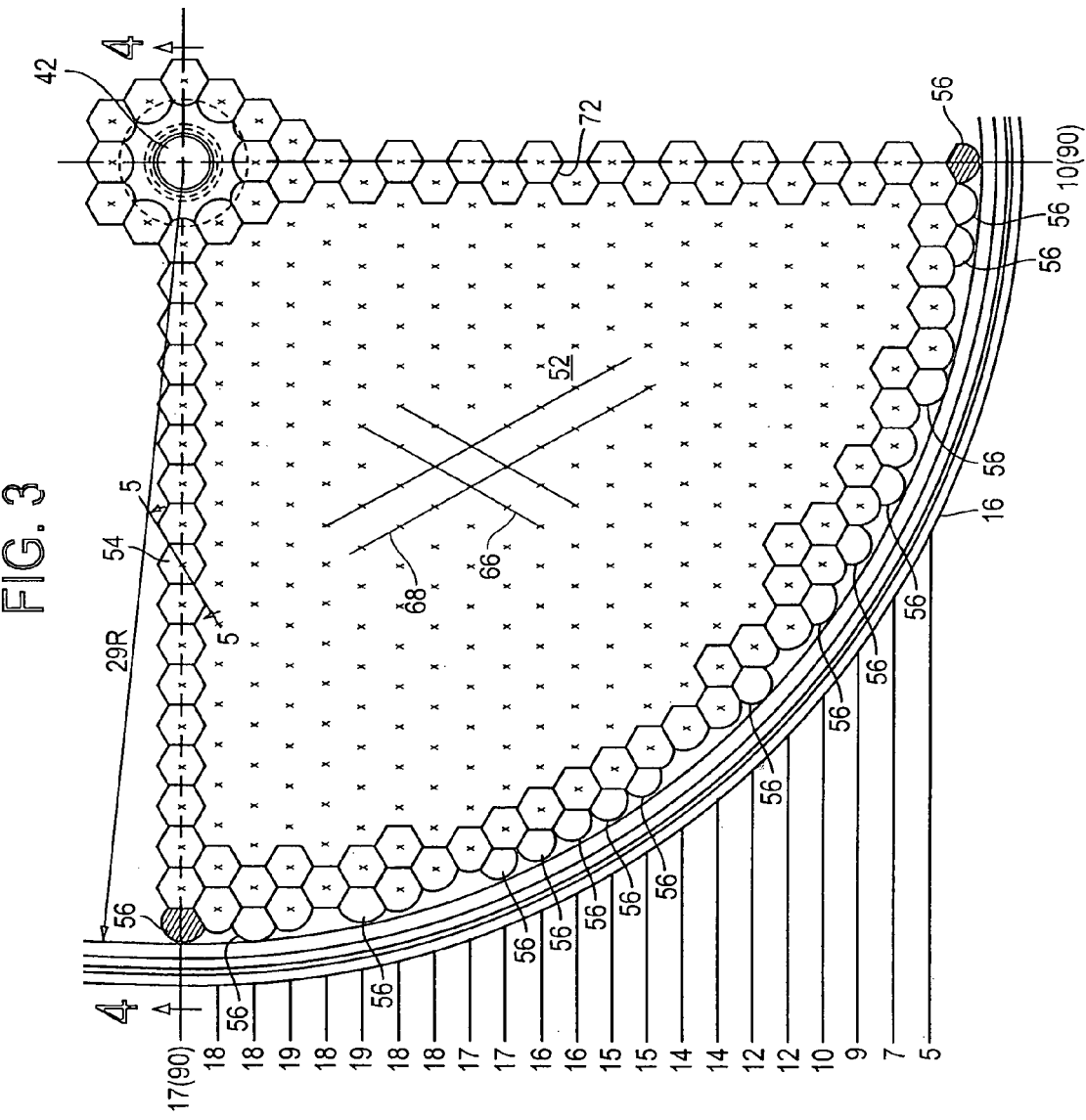
FIG. 3 is a fragmentary plan view of the grid plate of the catalyst activator of FIG. 2, showing the layout of the conical depressions.
Figure 4:
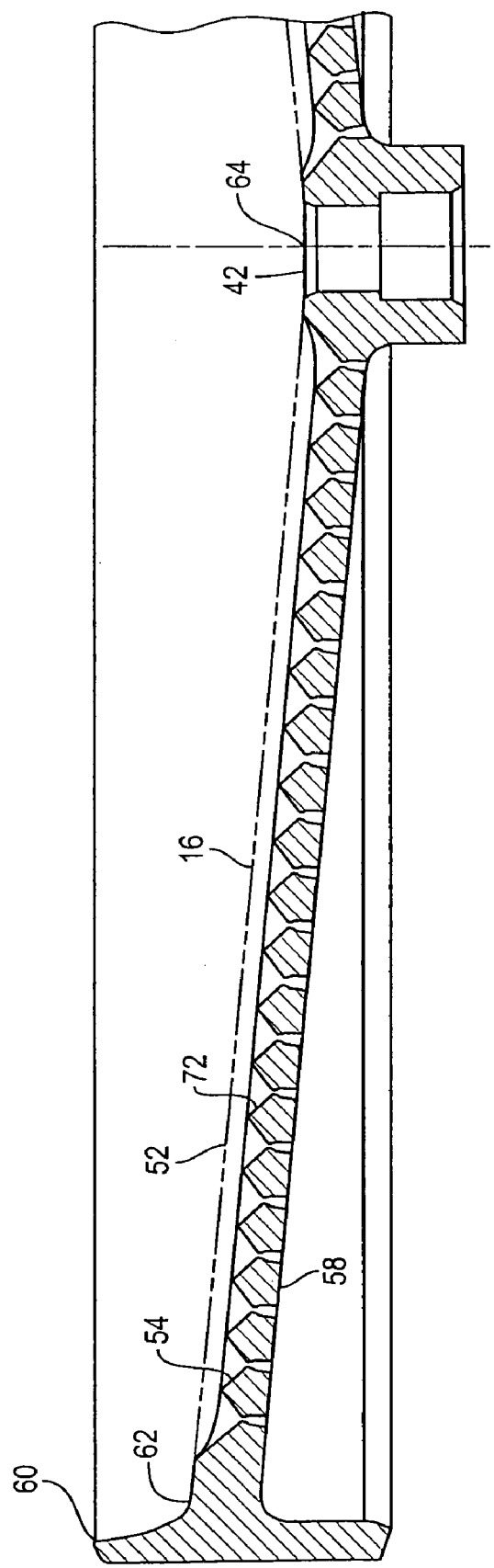
FIG. 4 is a section taken along section line 4—4 of FIG. 3.

FIGS. 3–7 show different parts of the grid plate 16 of the catalyst activator of FIG. 2. FIG. 3 shows one quarter of the grid plate 16. Referring now especially to FIG. 4, the grid plate 16 is normally generally horizontal, having an upper major surface 52 perforated with an array of generally conical depressions such as 54 and 56 (the depressions 56 are shown only in FIG. 3), a lower major surface 58, an outer flange 60 defining an outer margin 62, and a concave or lower center 64 normally disposed below the level of the outer margin 62. An "array" as used here is defined to include a patterned array or a randomized array. One example of a patterned array is a triangular array, more particularly an equilateral triangular array, as illustrated by this aspect of the invention. Another example of a suitable patterned array is a square array. The array may have a regular pattern or a randomized pattern. For any type of array, it may be desirable to ensure that no substantial amount of land or horizontal surface area be provided between the depressions.

The words "concave" and "concavity" are used to define the position of the center in relation to the outer margin, and are defined broadly so as to include upper major surfaces that are either linear or curved.

In this aspect of the invention the concavity in the upper major surface 52 is defined by an approximately 5.5° radial downward slope from the outer margin 62 to the center 64. Therefore, the upper major surface 52 is generally cone-shaped, its outer margin 62 defining the base and its center 64 defining the apex of the cone. This slight concavity or departure from an absolutely horizontal upper major surface 52 is provided so the grid plate 16 will drain when the charge 30 of catalyst is to be removed from the inner vessel 12.

The grid plate 16 has a drain aperture 42 located substantially at its apex or center 64 for passing treated particulate material down through the grid plate.

The grid plate 16 upper major surface 52 has a nominal diameter of at least 43 inches (1.09 m), alternatively at least 44 inches (1.12 m), alternatively at least 45 inches (1.14 m), alternatively at least 46 inches (1.17 m), alternatively at least 47 inches (1.19 m), alternatively at least 48 inches (1.22 m), alternatively at least 49 inches (1.24 m), alternatively at least 50 inches (1.27 m), alternatively at least 51 inches (1.3 m), alternatively at least 52 inches (1.32 m), alternatively at least 53 inches (1.35 m), alternatively at least 54 inches (1.37 m), alternatively at least 55 inches (1.4 m), alternatively at least 56 inches (1.42 m), alternatively at least 57 inches (1.45 m), alternatively at least 58 inches (1.47 m), alternatively at least 59 inches (1.5 m), alternatively at least 60 inches (1.52 m) (as in the illustrated aspect of the invention), alternatively at least 62 inches (1.57 m), alternatively at least 65 inches (1.65 m), alternatively at least 70 inches (1.78 m), alternatively at least 75 inches (1.91 m), alternatively at least 80 inches (2.03 m), alternatively at least 85 inches (2.16 m), alternatively at least 90 inches (2.29 m), alternatively at least 95 inches (2.41 m), alternatively at least 100 inches (2.54 m), alternatively at least 105 inches (2.67 m), alternatively at least 110 inches (2.79 m), alternatively at least 115 inches (2.92 m), alternatively at least 120 inches (3.05 m). The diameter of the portion of the upper major surface 52 that is drilled with apertures is about 58 inches (1.47 m) in this aspect of the invention.

Figure 7:
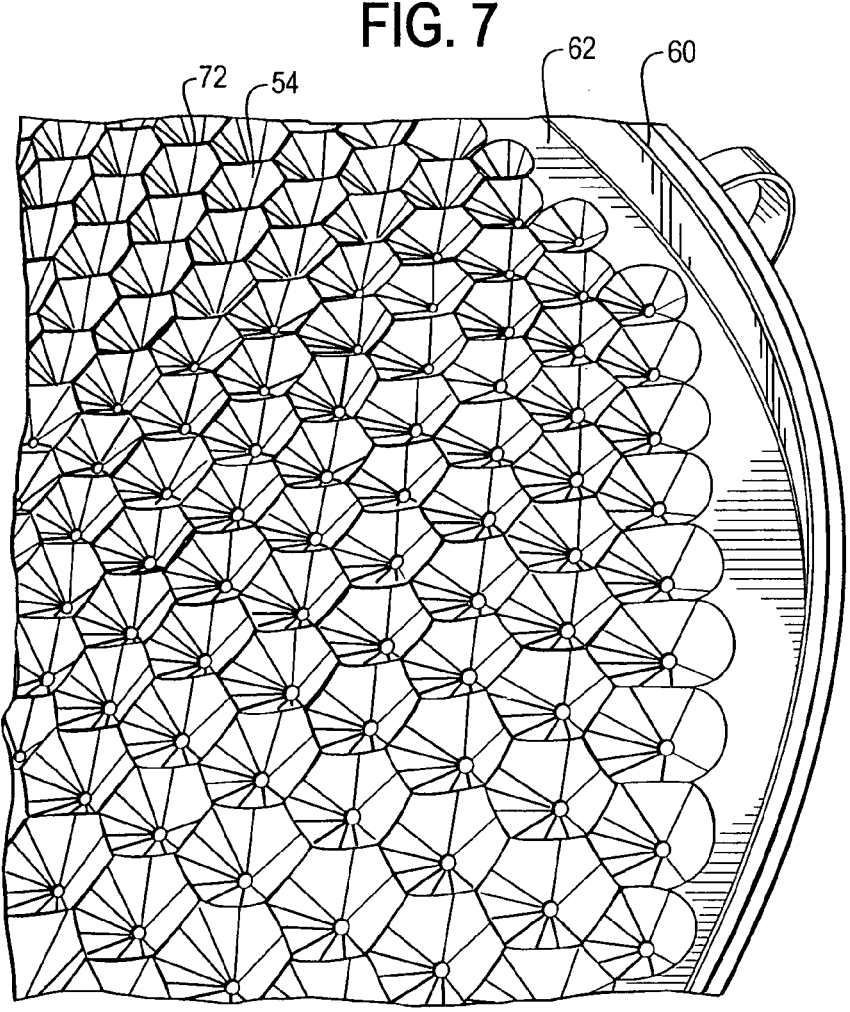
FIG. 7 is a fragmentary perspective view of the upper major surface of the grid plate of FIG. 3.

FIGS. 3, 4, and 7 show the layout of the 90° conical depressions such as 54, mostly shown as full hexagons in FIG. 3 (except for the marginal 90° conical depressions 54, which have a partially circular outer periphery). The 70.5° conical depressions 56 fit into the periphery where there is insufficient room for a 90° depression. The depressions 56 all have partially hexagonal, partially circular outlines.

The conical depressions 54, 56, are laid out in an equilateral triangular array, made up of a first family of equidistant parallel imaginary lines such as 66, crossed by a second family of equidistant parallel imaginary lines such as 68. The lines of the second family form angles of 60 degrees relative to the lines of the first family. The crossing points of the imaginary lines 66 and 68 locate the centers of the generally conical depressions 54 and 56. Other patterns of conical depressions are also contemplated.

In this aspect of the invention, the pitch or spacing between the adjacent parallel lines 66 or the adjacent parallel lines 68 is 1.5 inches (38.1 mm). This is closer spacing than was used in the 42-inch (1.07 m) prior art activator discussed in the background section, in which the pitch was 1²⁵⁄₃₂ or 1.781 inches (45.2 mm). Alternatively, the pitch can be 1.78 inches (45.2 mm), alternatively 1.77 inches (45.0 mm), alternatively 1.76 inches (44.7 mm), alternatively 1.75 inches (44.5 mm), alternatively 1.74 inches (44.2 mm), alternatively 1.73 inches (43.9 mm), alternatively 1.72 inches (43.7 mm), alternatively 1.71 inches (43.4 mm), alternatively 1.7 inches (43.2 mm), alternatively 1.69 inches (42.9 mm), alternatively 1.68 inches (42.7 mm), alternatively 1.67 inches (42.4 mm), alternatively 1.66 inches (42.2 mm), alternatively 1.65 inches (41.9 mm), alternatively 1.64 inches (41.7 mm), alternatively 1.63 inches (41.4 mm), alternatively 1.62 inches (41.1 mm), alternatively 1.61 inches (40.9 mm), alternatively 1.6 inches (40.6 mm), alternatively 1.59 inches (40.4 mm), alternatively 1.58 inches (40.1 mm), alternatively 1.57 inches (39.9 mm), alternatively 1.56 inches (39.6 mm), alternatively 1.55 inches (39.4 mm), alternatively 1.54 inches (39.1 mm), alternatively 1.53 inches (38.9 mm), alternatively 1.52 inches (38.6 mm), alternatively 1.51 inches (38.4 mm), alternatively 1.5 inches (38.1 mm), alternatively 1.49 inches (37.8 mm), alternatively 1.48 inches (37.6 mm), alternatively 1.47 inches (37.3 mm), alternatively 1.46 inches (37.1 mm), alternatively 1.45 inches (36.8 mm), alternatively 1.44 inches (36.6 mm), alternatively 1.43 inches (36.3 mm), alternatively 1.42 inches (36.1 mm), alternatively 1.41 inches (35.8 mm), alternatively 1.4 inches (35.6 mm), alternatively less than any of the previously stated values. Still smaller alternative pitches are also contemplated. One family of pitch lines may also be further apart than the other family of pitch lines, or the pitch lines may be different distances apart in different areas of the surface, without departing from the present invention.

In this aspect of the invention, the pitch was specified to obtain a desired number of holes, and the number and diameter of holes was specified to give the desired total required gas flow. The fluidization gas velocity through the holes was held the same as the rate previously used for a 42-inch catalyst activator so that particle attrition was not increased. This was accomplished by making the increased number of holes per unit area of grid proportionally smaller.

One advantage of reducing the pitch is that the depth of the conical depression required to provide fully overlapping depressions is reduced, which means that more of the thickness of the grid plate remains to support the weight of the grid plate and the catalyst. Another advantage of reducing the pitch is to increase the number of holes among which the flow is divided, so the distribution of the fluidizing medium is more uniform. Improved uniformity in the fluidization medium, resulting from the shorter distances between adjacent jets or sources of the fluidization medium, assures improved contact of the fluidization medium with the catalyst. This improves the uniformity and quality of the catalyst.

Figure 5:
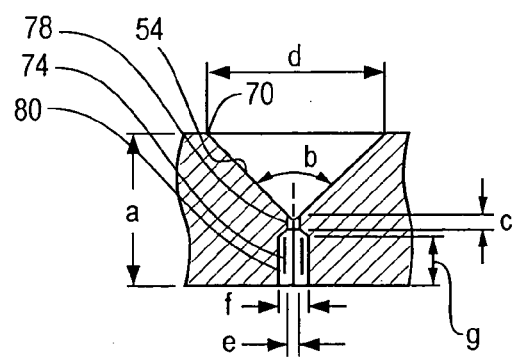
FIG. 5 is a fragmentary sectional view of a 90-degree conical depression, taken along section line 5—5 of FIG. 3.
Figure 6:
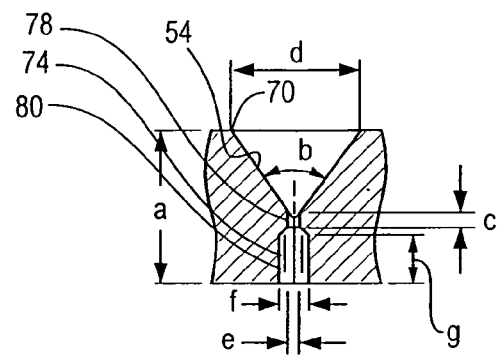
FIG. 6 is a fragmentary sectional view of a 70.5-degree conical depression, taken along section line 6—6 of FIG. 3.

Referring to FIG. 5, the 90° conical depressions 54 as milled into the upper major surface 52, without considering any of the overlapping depressions, are conical, and have circular margins 70. The conical depressions of the 42-inch (1.07 m) prior art grid plate (see FIG. 1) were generally conical as well. The nominal diameters of the 90° conical depressions of the 42-inch (1.07 m) prior art grid plate were 2.078 inches (52.78 mm). The nominal diameters of the present 90° conical depressions can be 2.07 inches (52.6 mm), alternatively 2.06 inches (52.3 mm), alternatively 2.05 inches (52.1 mm), alternatively 2.04 inches (51.8 mm), alternatively 2.03 inches (51.6 mm), alternatively 2.02 inches (51.3 mm), alternatively 2.01 inches (51.1 mm), alternatively 2.00 inches (50.8 mm), alternatively 1.99 inches (50.5 mm), alternatively 1.98 inches (50.3 mm), alternatively 1.97 inches (50.0 mm), alternatively 1.96 inches (49.8 mm), alternatively 1.95 inches (49.5 mm), alternatively 1.94 inches (49.3 mm), alternatively 1.93 inches (49.0 mm), alternatively 1.92 inches (48.8 mm), alternatively 1.91 inches (48.5 mm), alternatively 1.9 inches (48.3 mm), alternatively 1.89 inches (48.0 mm), alternatively 1.88 inches (47.8 mm), alternatively 1.87 inches (47.5 mm), alternatively 1.86 inches (47.2 mm), alternatively 1.85 inches (47.0 mm), alternatively 1.84 inches (46.7 mm), alternatively 1.83 inches (46.5 mm), alternatively 1.82 inches (46.3 mm), alternatively 1.81 inches (46.0 mm), alternatively 1.8 inches (45.7 mm), alternatively 1.79 inches (45.5 mm), alternatively 1.78 inches (45.2 mm), alternatively 1.77 inches (45.0 mm), alternatively 1.76 inches (44.7 mm), alternatively 1.75 inches (44.5 mm), alternatively 1.74 inches (44.2 mm), alternatively 1.73 inches (43.9 mm), alternatively 1.72 inches (43.7 mm), alternatively 1.71 inches (43.4 mm), alternatively 1.7 inches (43.2 mm) in diameter, alternatively less than any of the previously stated values. In the aspect of the invention illustrated, the diameters of the conical depressions at the base are 1.813 inches (46.05 mm).

The depths of the generally conical depressions in the 42-inch (1.07 m) prior art grid plate were uniformly one inch (25.4 mm), and the nominal thickness of the 42-inch (1.07 m) prior art grid plate was 1.125 inches (28.6 mm), so the depth of the generally conical depression was 89% of the nominal thickness of the plate. The depths of the generally conical depressions in the illustrated aspect of the invention are 0.91 inch (23.1 mm), and the nominal thickness of the grid plate is 1.625 inches (41.3 mm), so the depth of the conical depressions is 56% of the nominal thickness of the plate. Alternatively, the ratio of depression depth to nominal plate thickness can be 80%, 79%, 78%, 77%, 76%, 75%, 74%, 73%, 72%, 71%, 70%, 69%, 68%, 67%, 66%, 63%, 62%, 61%, 60%, 59%, 58%, 57%, 56%, 55%, 54%, 53%, 52%, 51%, 50%, or less.

As shown in FIG. 3, the margins of the non-peripheral depressions 54 are regular hexagons, in a plan view, because the generally conical depressions overlap essentially completely; their nominal base diameters are greater than their pitch. Where two adjacent conical depressions overlap, they intersect along a curved line 72 that is a segment of a circle lying in a plane perpendicular to the upper major surface 52. Viewed from above (FIG. 3) or in section (FIG. 4), the overlap appears as a straight line. FIG. 7 shows that the overlapping generally conical depressions 54 have six scallops defining their margins. This configuration is illustrated as well in FIG. 1, which shows the scalloped edges out of the plane of the section.

In the 42-inch (1.07 m) prior art grid plate, the pitch was 1.781 inches (45.2 mm), and the nominal base diameters of the generally conical depressions were 2.078 inches (52.78 mm), so the degree of overlap was:

$$((2.078/1.781)-1)\times 100\% = 16.7\%.$$

In one aspect of the present grid plate 16, the pitch is 1.5 inches (38.1 mm), and the nominal base diameters of the generally conical depressions 54 are 1.813 inches (46.05 mm), so the overlap is 20.86%. Alternative degrees of overlap contemplated here are 17%, 17.1%, 17.2%, 17.3%, 17.4%, 17.5%, 17.6%, 17.7%, 17.8%, 17.9%, 18%, 18.1%, 18.2%, 18.3%, 18.4%, 18.5%, 18.6%, 18.7%, 18.8%, 18.9%, 19%, 19.1%, 19.2%, 19.3%, 19.4%, 19.5%, 19.6%, 19.7%, 19.8%, 19.9%, 20%, 20.1%, 20.2%, 20.3%, 20.4%, 20.5%, 20.6%, 20.7%, 20.8%, 20.9%, 21%, 21.1%, 21.2%, 21.3%, 21.4%, 21.5%, 21.6%, 21.7%, 21.8%, 21.9%, 22%, or more.

Another way of viewing the distinction between the present invention and the prior art is that, in the present invention, the generally conical depressions are shallower, as a proportion of the thickness of the grid plate, but more overlapped, so there are more perforations per square inch or mm of the grid plate surface.

Comparing FIGS. 1 and 5, another difference between the present grid plate of FIG. 5 and the prior art grid plate of FIG. 1 is the configuration of the perforations 74 of the present invention, versus the perforations 76 of the prior art. The prior art perforation 76 is a simple bore having a diameter of 0.078 inch (1.98 mm) and a length of 1/8 inch (3.18 mm), drilled in the apex of the generally conical depression.

The perforation 74 of the present invention is a compound bore having an upper portion or neck or second generally cylindrical portion 78 and a lower or first generally cylindrical portion 80. The portion 78 communicates with the conical depression and has a diameter of 0.063 inch (1.59 mm), or less than 0.078 inch (1.98 mm), and a length of 1/8 inch (3.18 mm). Alternatively, the portion 78 can have a smaller diameter, such as 1/32 inch (0.031 inches, 0.79 mm). The portion 80 has a diameter of 0.25 inch (6.35 mm) and a depth of about 0.4 inch (10 mm), including a tapered back wall. Since the perforation 74 of the present invention is much longer than the perforation 76 of the prior art, and has a smaller diameter, it is more easily drilled by drilling the smaller-diameter part of the compound bore from above, and drilling the larger-diameter part of the compound bore from below. Since the very small diameter part of the bore is short, the very small drill bit is much less likely to shear off when the bores are being drilled.

The present invention can be distinguished from the prior art by the number of perforations in the grid plate 16. If the prior art 42-inch (1.07 m) grid plate (which has a field of holes 20 inches (508 mm) in radius, and 448 perforations), were simply scaled up to 60 inches (1.52 m) (with a field of holes 29 inches (737 mm) in radius) with the same pitch, it would have approximately:

$$448(29/20)^2 = 941 \text{ perforations}$$

The present 60-inch (1.52 m) grid plate has 1338 perforations, which is about 397 more than the number of perforations it would have if it were merely scaled up. Alternatively, the present 60-inch (1.52 m) grid plate has at least 1000, alternatively at least 1050, alternatively at least 1100, alternatively at least 1150, alternatively at least 1200, alternatively at least 1250, alternatively at least 1300, alternatively at least 1350, alternatively at least 1400, alternatively at least 1450, alternatively at least 1500, alternatively at least 1550, alternatively at least 1600, alternatively at least 1650, alternatively at least 1700, alternatively at least 1750, alternatively at least 1800, alternatively at least 1850, alternatively at least 1900, alternatively at least 1950, alternatively at least 2000, alternatively at least 2100, alternatively at least 2200, alternatively at least 2300, alternatively at least 2400, alternatively at least 2500, alternatively at least 2600, alternatively at least 2700, alternatively at least 2800, alternatively at least 2900, alternatively at least 3000, alternatively at least 3100, alternatively at least 3200, alternatively at least 3300, alternatively at least 3400, alternatively at least 3500, alternatively at least 3600, alternatively at least 3700, alternatively at least 3800, alternatively at least 3900, alternatively at least 4000, alternatively at least 4500, alternatively at least 5000, alternatively at least 5500, alternatively 6000 or more overlapping, generally conical depressions or perforations.

The present invention can further be distinguished from the prior art by the number of perforations in the grid plate 16, per square inch ($cm^2$) of the perforated plate radius. The prior art 42-inch (1.07 m) grid plate has a surface area of $3.14159 (20)^2 = 1257$ $in^2$ (8110 $cm^2$) and 448 perforations, or 0.356 perforations per square inch (2.30 per $cm^2$). The illustrated 60-inch (1.52 m) grid plate has a perforated surface area of $3.14159 (29)^2 = 2642$ $in^2$ and 1338 perforations, or 0.506 perforations per square inch (3.26 per $cm^2$). Alternative numbers of perforations per square inch contemplated herein are 0.36 per $in^2$ (2.32 per $cm^2$), 0.37 per $in^2$ (2.39 per $cm^2$), 0.38 per $in^2$ (2.45 per $cm^2$), 0.39 per $in^2$ (2.52 per $cm^2$), 0.4 per $in^2$ (2.58 per $cm^2$), 0.41 per $in^2$ (2.65 per $cm^2$), 0.42 per $in^2$ (2.71 per $cm^2$), 0.43 per $in^2$ (2.77 per $cm^2$), 0.44 per $in^2$ (2.84 per $cm^2$), 0.45 per $in^2$ (2.90 per $cm^2$), 0.46 per $in^2$ (2.97 per $cm^2$), 0.47 per $in^2$ (3.03 per $cm^2$), 0.48 per $in^2$ (3.097 per $cm^2$), 0.49 per $in^2$ (3.16 per $cm^2$), 0.5 per $in^2$ (3.23 per $cm^2$), 0.51 per $in^2$ (3.29 per $cm^2$), 0.52 per in (3.35 per $cm^2$), 0.53 per $in^2$ (3.42 per $cm^2$), 0.54 per $in^2$ (3.48 per $cm^2$), 0.55 per $in^2$ (3.55 per $cm^2$), 0.56 per $in^2$ (3.61 per $cm^2$), 0.57 per $in^2$ (3.68 per $cm^2$), 0.58 per $in^2$ (3.74 per $cm^2$), 0.59 per $in^2$ (3.81 per $cm^2$), or 0.6 per $in^2$ (3.87 per $cm^2$).

In the illustrated aspects of the invention, a multiplicity of the generally conical depressions overlap six other contiguous generally conical depressions. This is true of all the non-peripheral generally conical depressions, in the illustrated aspect of the invention. Further, a multiplicity of the overlapping, generally conical depressions overlap less than six other contiguous generally conical depressions, in the illustrated aspect of the invention. This is true of the peripheral generally conical depressions.

The number of perforations in the grid plate 16 per unit area is greater, but the diameter of the neck of each perforation, which limits the flow velocity, is less, than in the prior art. By providing more closely spaced, smaller diameter holes, the overall air flow is kept about the same, but is more finely distributed across more holes, which improves the quality of fluidization and reduces the maximum airflow velocity at any one point (in particular, directly in front of the hole). This change is contemplated to reduce catalyst particle attrition and to improve the contact efficiency between the catalyst and the fluidization air because of the reduced distances between adjacent holes.

The grid plate 16 can be made of any suitable material that will withstand the conditions of activation. One example of a suitable material is an INCONEL® 601 nickel-chromium-aluminum alloy forging. If fabricated as indicated herein, the grid plate 16 will support a catalyst load of at least 1500 lb (680 kg).

Other suitable materials suitable for use as porous substrates are sintered materials which retain their structural integrity at activation temperature, which have a pore size such that the substrate will not blind with catalyst fines, and which are resistant to oxidation at operating conditions which would result in a reduction in permeability. Representative of such materials are type 316 stainless steel, INCONEL® alloys or HASTELLOY® alloys. Generally, the porous substrates can be formed from high melting alloys of nickel, iron, and at least one other metal selected from the following group: chromium, molybdenum, silicon, copper, and aluminum with alloys of nickel, iron, and chromium being specifically contemplated.

The process of the present invention can be readily applied to the activation of any solid particulate material, regardless of type and regardless of the activating fluid. More particularly, the present invention is suited for the activation of particulate metal oxide catalytic materials, especially such catalytic materials as are employed in polymerization reactions.

Catalytic materials which are especially advantageously activated in accordance with this invention are supported monoolefin polymerization catalysts comprising chromium, at least a portion of which is in the hexavalent form such as chromium trioxide. These chromium-containing catalysts and their use as polymerization, particularly monoolefin polymerization, catalysts are well known. A representative method of preparing such catalysts is disclosed in U.S. Pat. No. 2,825,721, the disclosure of which is incorporated here by reference. As set forth in that patent, the supported chromium oxide catalysts can be prepared by depositing chromium oxide (e.g., $Cr_2O_3$) or a chromium compound calcinable to chromium oxide, on a suitable support and activating to leave part of the chromium on the support in the hexavalent form. The support can be selected from one or more of the following members: silica, alumina, thoria, zirconia, silica-alumina, silica-thoria, silica-zirconia, acid-treated clays, and other materials generally known in the art as catalyst supports. One suitable catalyst is a silica gel-supported chromium oxide.

As previously noted, the solid particulate catalysts are activated in accordance with the present invention by heating the particulate catalyst at a suitable activation temperature for a specified period of time. After such activation, the catalyst is cooled, purged with an inert gas, and collected in a dry container. The activation can be accomplished, for example, by heating the bed or deposit of catalyst at a temperature in the range of about 400° F. (204° C.) to about 2000° F. (1090° C.), alternatively about 800°F. (about 427°) to about 1800° F. (about 982° C.), for about 60 minutes to about 20 hours, alternatively about 4 hours to about 12 hours. This activation at elevated temperatures can be done in several stages such as gradually heating the bed of catalyst particles to an intermediate temperature of approximately 400° F. to about 800° F. (204° C. to about 427° C.) and holding the particles at that temperature for 30 minutes to 2 hours after which a higher temperature, e.g., 1400° F. (760° C.), is employed.

Catalysts activated in accordance with the present invention are extremely valuable in the polymerization and copolymerization of polymerizable olefins, especially aliphatic and cyclic olefins including both mono- and diolefins, for example, ethylene, butadiene, and the like.

To further illustrate the invention, a catalyst can be prepared by impregnating a coprecipitated gel composite containing 90 weight percent silica and 10 weight percent alumina with an aqueous solution of chromium nitrate. The total chromium trioxide content of the catalyst is 2.5 weight percent. The composite is activated with the present apparatus at a temperature of 1650° F. (899° C.) for 12 hours, using a superficial air velocity of 0.1 fps (3 cm/sec). The conditioned catalyst thus made is suitable for the polymerization of ethylene to produce polyethylene. The chromium content is essentially intact, while the adsorbed water is completely removed. The catalyst loss is minimal, i.e., virtually all catalyst charged to activator is recovered in an activated condition, in comparison to standard activation treatments wherein catalyst loss can approach values considerably in excess of 50 percent and are as high as 65 percent.

What is claimed is:

1. A catalyst activator vessel for heat conditioning a catalyst, comprising:
   A. an inner vessel for containing a catalyst charge;
   B. an outer vessel generally surrounding said inner vessel;
   C. a flue defined by the space between said inner and outer vessels;
   D. a normally generally horizontal grid plate disposed in said inner vessel, said grid plate having an upper major surface, a lower major surface, and a nominal plate thickness between the upper and lower major surfaces;
   E. an array of generally conical depressions in said upper major surface that overlap by at least 17% and have a depression depth of 80% or less of the nominal plate thickness;
   F. holes perforating said grid plate, said holes extending from at least some of said generally conical depressions through said lower surface; and
   G. a fluid path extending upwardly through said holes and adapted to pass a fluid through said grid plate for fluidizing a particulate material disposed above said grid plate in said inner vessel.

2. The catalyst activator vessel of claim 1, wherein said generally conical depressions have apices and at least some of said generally conical depressions and holes are generally funnel-shaped.

3. The catalyst activator vessel of claim 2, wherein at least some of said holes are defined by the walls of bores having first generally cylindrical portions perforating said lower major surface and intersecting, smaller diameter, second generally cylindrical portions perforating the apices of said generally conical depressions.

4. The catalyst activator vessel of claim 3, wherein said second generally cylindrical portions have diameters of about 0.0625 inch (1.5 mm).

5. The catalyst activator vessel of claim 3, wherein said second generally cylindrical portions have diameters of about 0.078 inch (1.98 mm).

6. The catalyst activator vessel of claim 1, wherein said upper major surface has an outer margin and a concave center normally disposed below the level of said outer margin.

7. The catalyst activator vessel of claim 6, wherein said upper major surface is generally cone-shaped, said outer margin defining the base and said center defining the apex of the cone.

8. The catalyst activator vessel of claim 7 further comprising a drain hole located substantially at said apex for passing treated particulate material down through said plate.

9. The catalyst activator vessel of claim 1, wherein said grid plate upper major surface has a nominal diameter of at least 50 inches (1.27 m).

10. The catalyst activator vessel of claim 1, wherein said grid plate upper major surface has a nominal diameter of at least 58 inches (1.47 m).

11. The catalyst activator vessel of claim 1, wherein said grid plate upper major surface has a nominal diameter of at least 120 inches (3.048 m).

12. The catalyst activator vessel of claim 1, wherein said grid plate upper major surface has at least 1000 overlapping, generally conical depressions.

13. The catalyst activator vessel of claim 1, wherein said grid plate upper major surface has at least 1100 overlapping, generally conical depressions.

14. The catalyst activator vessel of claim 1, wherein said grid plate upper major surface has at least 1300 overlapping, generally conical depressions.

15. The catalyst activator vessel of claim 1, wherein said grid plate upper major surface has at least 6000 overlapping, generally conical depressions.

16. The catalyst activator vessel of claim 1, wherein said grid plate upper major surface has on average at least 0.40 overlapping, generally conical depressions per square inch (2.58 per cm$^2$) of said upper major surface.

17. The catalyst activator vessel of claim 16, wherein said grid plate upper major surface has on average at least 0.45 overlapping, generally conical depression per square inch (2.9 per cm$^2$) of said upper major surface.

18. The catalyst activator vessel of claim 1, wherein a multiplicity of said overlapping, generally conical depressions completely overlap at least three other contiguous generally conical depressions.

19. The catalyst activator vessel of claim 1, wherein a multiplicity of said overlapping, generally conical depressions overlap other contiguous generally conical depressions.

20. The catalyst activator vessel of claim 1, wherein said grid plate is made of a nickel-chromium-aluminum alloy forging, has a nominal thickness of 1 ⅝ inches (41.3 mm), said upper major surface has a diameter of at least 58 inches (1.47 in), and said grid plate will support a catalyst load of at least 1500 lb (680 kg).

21. A catalyst activator vessel for heat conditioning a catalyst, comprising:
  A. an inner vessel having an inside diameter of at least 50 inches (1.27 m) for containing a catalyst charge;
  B. an outer vessel generally surrounding said inner vessel;
  C. a flue defined by the space between the inner and outer vessels;
  D. a normally generally horizontal, perforated grid plate disposed in said inner vessel; and
  E. a fluid path extending upwardly through said grid plate and adapted to pass a fluid through said grid plate for fluidizing particulate material disposed above said grid plate in said inner vessel.

22. A fluidization bed comprising:
  A. a vessel comprising, an inner vessel and an outer vessel generally surrounding said inner vessel;
  B. a normally generally horizontal, perforated grid plate disposed in said inner vessel, said grid plate having an upper major surface and a lower major surface;
  C. an array of generally conical depressions in said upper surface that overlap by at least 17%, said grid plate being perforated by holes extending from at least some of said generally conical depressions through said lower surface; and
  D. a fluid path extending upwardly through said grid plate and adapted to pass a fluid through said grid plate for fluidizing particulate material disposed above said grid plate in said inner vessel.

23. A perforated grid plate comprising:
  A. an upper major surface having an array of generally conical depressions with a depression depth;
  B. a lower major surface;
  C. a nominal plate thickness between the upper major surface and the lower major surface; and
  D. holes extending from at least some of the generally conical depressions through the lower surface to form perforations on the grid plate, wherein the generally conical depressions overlap by at least 17%, and wherein said depression depth of said generally conical depressions is 80% or less of the nominal plate thickness.

* * * * *